United States Patent [19]

Collignon

[11] 4,024,673
[45] May 24, 1977

[54] MACHINES WITH A CIRCULAR BLANK-HOLDER SPINDLE

[75] Inventor: Robert G. Collignon, Bois d'Arcy, France

[73] Assignee: CNMP Berthiez, France

[22] Filed: June 21, 1976

[21] Appl. No.: 697,966

[30] Foreign Application Priority Data

June 25, 1975 France .............................. 75.19964

[52] U.S. Cl. ............................. 51/131; 51/240 T; 90/58 B
[51] Int. Cl.² ..................... B24B 7/04; B24B 41/06
[58] Field of Search ............ 51/131, 237 R, 240 T, 51/240 R; 269/289; 90/58 B

[56] References Cited
UNITED STATES PATENTS 1,655,099  1/1928  Hulse ................................ 51/240 T
3,884,122  5/1975  Chernou ........................ 51/240 T

*Primary Examiner*—Harold D. Whitehead
*Assistant Examiner*—Nicholas P. Godici
*Attorney, Agent, or Firm*—Bucknam and Archer

[57] ABSTRACT

The contact surfaces between a seat and a base member are planar. This base member defines a shouldered bore for a retaining plate connected to the seat by locking and unlocking screws. This seat is integral with a pivot which is in two parts, whereof one is slidingly mounted in the said plate parallel to its rotation axis, while the other is off-centered relative to this axis in order to support at least one central bearing for the table. These improvements are applicable to machine tools having a rotary circular table and a tool-holder spindle, whose axes must be brought into the same plane by precise regulation.

6 Claims, 2 Drawing Figures

MACHINES WITH A CIRCULAR BLANK-HOLDER SPINDLE

BACKGROUND OF THE INVENTION

The present invention relates to improvements to machines having a circular blank-holder table and a tool-holder spindle, but more specifically to the device permitting a coincidence of their respective rotation axes.

In the machine tool such as a vertical grinder, miller or machining centre it is essential to be able to accurately position the plate axis in such a way as to be precisely located in the tool displacement plane. For example, if the wheel axis is not located precisely in the same vertical plane as the plate axis when grinding a spherical or conical surface this either leads to a torus variant or to a hyperboloid envelope surface, this shaping error being unacceptable.

BRIEF SUMMARY OF THE INVENTION

The main object of the invention is the precise positioning of the plate axis.

A subsidiary object thereof is, within the framework of the precise positioning of the rotation axis to make the plate and its base plate into a subassembly which is easy to machine, regulate during assembly and operation, maintain and assemble with other subassemblies forming the machine.

A further object of the present invention is to provide easy access on the one hand to the drive system, which in the case of a grinder is very often a belt in order to permit the latter to be changed and on the other hand to the axis regulating member.

To achieve these objects and in accordance with the invention, the contact surfaces between a seat for the rotary table and a base member are planar, the base member defines a shouldered bore for the centering and support of a retaining plate connected to the seat by peripheral locking means permitting the locking of the said seat against the base member whilst permitting the seat and its retaining plate to rotate freely when the locking means are unlocked, the seat being integral with a two-part pivot, whereof one part is slidingly mounted in the said retaining plate parallel to its rotation axis, whilst the other part off-centred relative to the said axis for supporting at least one central bearing for the rotary guidance of the table, so that the rotation axis of the latter is regulated by simply pivoting the seat.

Moreover, the above-mentioned central bearing cooperates with a concentric peripheral roller path, placed between the seat and table, said bearing comprising a rotary thrust block inserted between the said table and a pressing member carried by the second portion of the pivot to apply the seat to the base member via the peripheral roller part.

BRIEF DESCRIPTION OF THE DRAWINGS

Other and further objects of the present invention will be apparent from the description and claims and are illustrated in the accompanying drawings which by way of illustration show preferred embodiments of the invention and the principles thereof and what are now considered to be the best modes contemplated for applying these principles. Other embodiments of the invention embodying the same or equivalent principles may be used and structural changes may be made if desired by those skilled in the art without departing from the invention and the scope of the appended claims. In the drawings show:

DETAILED DESCRIPTION OF THE PREFERRED EMBODIMENTS

Figure 1:
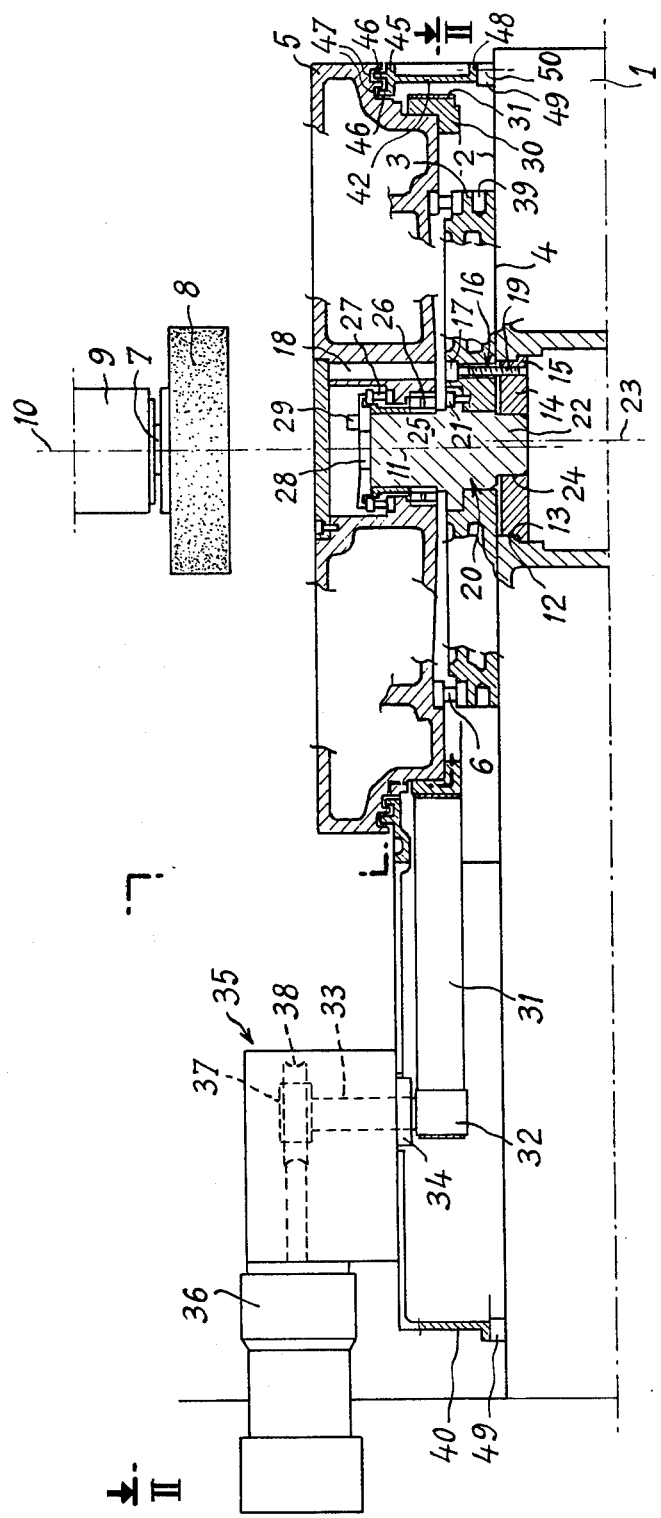
FIG. 1 a partly torn away elevation showing the improvements according to the invention.
Figure 2:
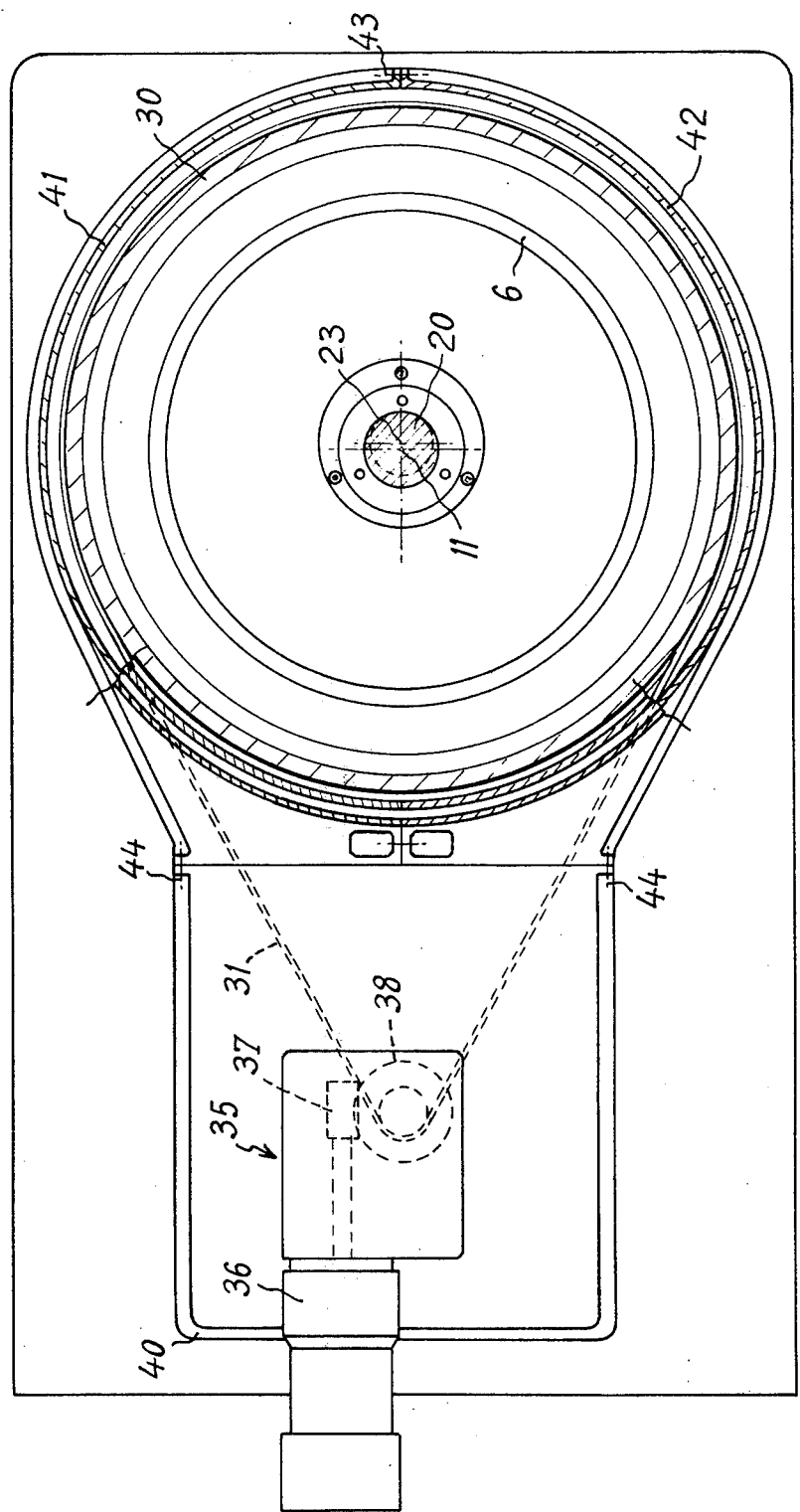
FIG. 2 is a partial plan view along the line II—II of FIG. 1, the table being removed and torn away.

The machine comprises a base member 1 whose upper surface 2 is perfectly planar and a circular seat 3 whose lower surface 4 is also planar, in such a way that these surfaces can be applied to one another with great precision.

The machine also comprises a circular table 5 placed above the seat 3 and resting on the latter via a peripheral roller path 6, whose supporting rings are placed in the centering bearings of the said seat and the said table.

Finally, the machine comprises a spindle 7 carrying a grinding wheel 8 and mounted in a sleeve 9 so as to rotate about a rotation axis 10 for machining any blank which can be clamped to table 5.

It is now a question of providing means so that the rotation axis 11 of table 5 is located as a result of easily accessible and precisely regulatable means in the displacement path of the rotation axis 10 of wheel 8. Thus, axes 10 and 11 coincide perfectly for a particular position thereof.

Base member 1 defines a very precise cylindrical bore 12, great precision being necessary because this serves as a setting reference. This bore issues onto the planar surface 2 and an inner shoulder 13. A retaining plate 14 is centred in bore 12 and has a projecting flange 15 which can be supported against shoulder 13. Plate 14 is connected to seat 3 by screws 16, whose heads strike against the latter and are accessible from the outside, for the manipulation thereof, through holes 18 made in table 5. The stems 19 of the screws traverse the said seat and there threaded portions cooperate with tapped holes located facing in the retaining plate 14.

Seat 3 is integral with a central pivot 20 which in the present example, is inserted and fixed by means of screws 21. This pivot 20 has a lower projecting portion 22 mounted so as to slide relative to the retaining plate 14 in a direction parallel to the rotation axis 23 of the said plate. It is important that this rotation axis 23 is positioned with great geometrical precision relative to seat 3, but it must be possible to move the plate away from the latter. In the present example, portion 22 is a cylindrical pivot pin fitted into a bore 24 which is perfectly centred on axis 23, i.e. concentric relative to bore 12.

In other words, on loosening screws 16 the assembly formed by plate 14 and seat 3 can pivot about axis 23. However, on tightening screws 16 through holes 18, contact surfaces 2 and 4 are applied firmly against one another, whereby seat 3 is immobilised relative to the base member 1.

The central pivot 20 also has an upper projecting portion 25 for the purpose of supporting a centering bearing for table 5. In the represented example, portion 25 is a cylindrical pivot pin centred on rotation axis 11 of the table but off-centred relative to rotation axis 23 of retaining plate 14 and therefore seat 3. In the same example, the bearing comprises a member 26 and a thrust bearing 27.

In order to raise table 5 the latter must be axially immobilised relative to pivot pin 25. To this end a pressing member is placed between the latter and the rotary thrust bearing. This pressing member makes it possible to axially preload not only bearing assembly 26, 27, but also the peripheral roller path 6 due to the rigidity of table 5. The preloading of path 6 is extremely interesting because seat 3, which is applied against the base member 1 by screws 16 intervening in the centre, is now applied by the said roller path acting on the periphery.

In the present example, the pressing member is an elastically deformable clamp 28, fixed by screws 29 to the end of pivot pin 25 and having a projecting periphery applied against the rotary thrust bearing 27. Obviously, the clamp 28 can be replaced by cupped washers Or any equivalent means.

It is now clear that due to the fact that the geometrical axes of the pivot pins 22 and 25 are off-centred, the position of the rotation axis 11 of table 5 can be modified by pivoting seat 3 in order to bring it into the displacement plane of the rotation axis 10 of the wheel.

For the purposes of its rotation, table 5 is integral or made integral with a circular bearing 30 concentric to axis 11. This bearing serves for the winding of a driving belt 31 which also passes, about a driving pulley 32. The latter is keyed on a shaft 33 supported on a bearing 34 and is coupled to a drive device 35. In the presented example, this device is a geared motor, comprising a motor 26 connected to an endless screw 37 meshing with a tangent wheel 38 integral with shaft 33.

For protection purposes, a casing is placed between table 5 and base member 1 up to geared motor 35. This casing must be easy to remove so that access can be given to the belt 31 for its replacement and to the seat 3 for its regulation by pivoting. To this end, the seat has peripheral holes 39 offering a hold for any manipulating tool, such as a fork spanner. These holes issue below the lower level of belt 31.

The casing has a fixed housing 40 on which the geared motor 35 is mounted and covers the belt 31 and pulley 32 upto the vicinity of table 5. It is inserted and fixed in detachable manner onto the base member 1. The casing also has two half-shells 41 and 42 extending between table 5 and base member 1. They are fixed to one another by bolts 43 and to the housing 40 by bolts 44.

According to the preferred embodiments shown in the drawings, the half-shells 41 and 42, when assembled, have a circular upper rim 45 centred on the rotation axis 11 and having as a projection lips 46 which penetrate the conjugate grooves 47 of table 5 in order to form a labyrinth seal over the entire periphery of the latter. The half-shells 41 and 42 also have, when assembled a circular lower rim 48 extending beneath belt 31 and resting on a detachable setting ring 49 which is in two parts and supported on base member 1, the assembly being fixed by means of screws 50. The thickness of rim 49 is at least equal to the the penetration height of lips 46 into grooves 47. In order to dismantle the casing, it is merely necessary to remove bolts 43, 44 and screws 50, disengage the two portions of ring 49 beneath the half-shells 41, 42 and the housing 40, lowering the latter in order to extract lips 46 from grooves 47, whereby at least these half-shells are disconnected.

The improvements forming the object of the invention are applicable to machine tools having a circular rotary table and a tool-holder spindle, whose axes must be brought into the same plane by precise regulation.

The invention is not limited to the emodiments described and represented hereinbefore and various modifications can be made thereto without passing beyond the scope of the invention.

What is claimed is:

1. A machine having a circular blank-holder table and a tool-holder spindle comprising a device for making their respective rotation axes coincide, involving the application of an eccentric, whereby the machine also comprises a base plate, a seat, means for supporting and guiding in rotation placed between the table and the seat, means for rotating the said table and means for protecting the latter, wherein the contact surfaces between the seat and a base member forming the base plate are planar, wherein the base member defines a shouldered bore for the centering and supporting of a retaining plate connected to the seat by peripheral locking means permitting the locking of the said seat against the base member, whilst permitting the seat and the retaining plate to rotate freely when the locking members are unlocked and wherein the seat is integral with a pivot in two parts, whereof one is slidingly mounted in the said retaining plate parallel to its rotation axis, whilst the other is off-centred relative to this axis in order to support at least one central bearing for the rotary guidance of the table, the regulation of the rotation axis of the latter being obtained by simply pivoting the seat.

2. A machine according to claim 1, wherein the central bearing cooperates with a peripheral concentric roller path, placed between the seat and the table and wherein this bearing comprises a thrust bearing placed between the said table and a pressing member carried by the second portion of the pivot for applying the seat to base member via the peripheral roller path.

3. A machine according to claim 2, wherein the pressing member is an elastically deformable clamp fixed to the end of the second portion of the pivot and supported on the rotary thrust bearing by its projecting peripheral edge.

4. A machine according to claim 1, wherein the above locking means are constituted by screws, whose heads are supported on the seat and whereof the threaded portion cooperates with the tapped hole in the retaining plate, these screw heads being accessible from the top of the table via holes made in the latter.

5. A machine according to claim 1, wherein concentrically relative to the pivot, the table has externally of the seat and above the base member, a circular bearing for winding a flexible drive, such as a belt, driven by a laterally off-set rotary motor means and wherein the above-mentioned protection means comprises two half-shells extending between the table and the base member, said half-shells being detachable to provide access not only to the drive means but also to the seat for the purpose of regulating the rotation axis.

6. A machine according to claim 5, wherein the assembled half-shells, on an upper circular rim centred on the rotation axis, have projecting lips which are able to penetrate into the conjugate grooves of the table in order to form a labyrinth seal and wherein the assembled half-shells also have a lower circular rim centred on the rotation axis, said rim resting on a detachable setting ring, in two portions supported on the base member and whose thickness is at least equal to the penetration height of the said lips.

* * * * *